United States Patent Office 3,687,873
Patented Aug. 29, 1972

3,687,873
METHOD FOR RECLAMATION OF MULTI-COMPONENT MIXTURES OF WASTE THERMOPLASTIC MATERIALS
Earle L. Kropscott, Midland, Mich., Robert R. Blanchard, Port Allen, La., and James N. Schramm, Baton Rouge, La., assignors to The Dow Chemical Company, Midland, Mich.
No Drawing. Filed Oct. 26, 1970, Ser. No. 84,149
Int. Cl. C08f 47/24
U.S. Cl. 260—2.3          2 Claims

ABSTRACT OF THE DISCLOSURE

A method of reclamation of mixtures of waste thermoplastic materials into compatible blends of improved properties comprising preparing a fusion blend of such materials with from about 15 to 35 weight percent of certain chlorinated olefin polymers.

BACKGROUND

The production of plastic materials is reaching a quantity where disposal is becoming a major problem, e.g., it has been estimated that solid waste generated in the United States alone is about 360 million tons a year with plastic's share of this amount currently being from about 2 to 5 weight percent. This amount is expected to increase as plastic's production and use increases.

Currently, four techniques are used for disposing of solid wastes containing plastics. These are incineration, sanitary land fill, reuse or recycling and biodegradation.

The preferred technique would be the recycling or reuse of the waste plastic materials. However, the difficulty is that there is now no adequate sorting system. Further, where plastics are segregated at the source of disposal, reuse requires cleaning, reprocessing and adding to virgin material of like composition. The preferred technique would be to collect all waste plastic materials in whatever amounts they occur, then clean, and combine them to form usable products.

It has been found, however, that fusion blends of large volume plastics combined without segregation results in products characterized by undesirably low elongation and are of a cheesy, brittle nature.

It is the primary purpose of the present invention to provide usable products out of unsegregated thermoplastic waste products.

THE INVENTION

The above object is accomplished by preparation of a fusion blend of multiple component mixtures of waste thermoplastic materials with from about 15 to 35 weight percent, based on the weight of said blend, of a chlorinated olefin polymer containing from about 25 to 50 weight percent of chemically combined chlorine and having a relative crystallinity of less than about 10 percent when containing about 34 or more weight percent chlorine and a melt viscosity of from about 10,000 to 30,000 poise as determined on an Instron Rheometer operating at 190° C. at a 150 sec.$^{-1}$ shear rate.

DESCRIPTION OF THE PREFERRED EMBODIMENTS

The chlorinated olefin polymers found to be useful for the purposes of the present invention are preferably prepared by the chlorination, in suspension in an inert diluent, of polyethylene or interpolymers containing at least about 90 mole percent of ethylene in the polymer molecule with any remainder being one or more ethylenically unsaturated comonomers wherein such polymers are preferably of an essentially linear structure. Such chlorinated olefin polymers contain from about 25 to 50, and preferably about 42 weight percent of chemically combined chlorine and are characterized by having a relative crystallinity of between about 15 and 28 percent when containing about 25 weight percent chlorine and a relative crystallinity of less than about 10 percent when containing about 34 or more weight percent chlorine, wherein said relative crystallinity is a measure of the ratio of the crystalline peak areas to the sum of the amorphous plus crystalline peak area as determined by conventional X-ray diffraction techniques.

The chlorinated polyolefins employed in the present invention can be readily obtained by practice of a chlorination procedure which comprehends the suspension chlorination in an inert medium of polymers and interpolymers of ethylene, as hereinafter more fully defined, to a desired total of combined chlorine, wherein such polyolefin is first chlorinated at a temperature of up to about 95° C., and preferably between about 65° C. and 90° C. for a period sufficient to provide a chlorine content of not more than about 23 weight percent chlorine, based on the total weight of the polymer; followed by the sequential suspension chlorination of such polymer, in a particulate form, at a temperature above that employed for the herein described first chlorination and not more than about 150° C. and preferably below the crystalline melting point of the polymer.

Exemplary of preferred polyolefinic materials to be chlorinated are those distinct species and varieties of essentially linear and unbranched highly porous, finely divided polymers containing at least about 90 mole percent ethylene in the polymer molecule with the remainder being one or more ethylenically unsaturated comonomers such as the nonaromatic hydrocarbon olefins having 3 or more carbon atoms, including propylene, butene-1 and butene-2, and 1,7-octadiene and the like; cycloaliphatic olefins such as 1,5-cyclopentene and cyclooctadiene and the like, substituted olefins such as acrylic acid and its esters; conjugated diolefins such as butadiene and the like; and the alkenyl aromatic compounds such as styrene and its derivatives, among many other polymerizable materials known to the art.

Advantageously, the polymers and interpolymers, described herein, are prepared under the influence of catalyst systems comprising admixtures of strong reducing agents such as triethyl aluminum and compounds of Groups IV–B, V–B and VI–B metals of the Periodic System, such as titanium tetrachloride, and the like, and are characterized by having molecular weights ranging generally less than about 1,000,000 and preferably between about 20,000 and 300,000.

The liquid which is employed to suspend the finely divided polymer may be any liquid which is inert to the polymer and is not affected to an appreciable extent by chlorine, or which, while wetting the polymer will not have an appreciable solvent effect on it. While water may be employed with especial advantage as a suspending liquid for the polyolefins to be chlorinated, the polymers may also be suspended in other inert liquids.

A variety of wetting agents, including organic sulfonates, sulfates, polyphosphates and other types of ionic and anionic surfactant materials may be suitably employed, if desired, to assist the inert suspending liquid (particularly when such liquid is water) to wet the polymer. Such materials as sodium lauryl sulfate and alkyl aryl polyether alcohols are illustrative of specific wetting agents that may be utilized. The employment of a wetting agent facilitates the mechanical handling of the suspended polymer during the suspension chlorination. In some cases, however, it may not be necessary to employ wetting agents, especially when a freshly prepared polymer is employed that is undried after its preparation or when efficient agitation is available for producing and maintaining the polymer slurry.

Further, if it is desired to accelerate the chlorination rate the reaction may be assisted by the employment of small quantities of catalysts, such as the free-radical types and/or ultraviolet light. When a free-radical catalyst is employed, the rate of reaction which is accomplished through the assistance of the catalyst will depend on such factors as the catalyst concentration, the temperature of the suspending medium in which the catalyst is dissolved, the pH of the solution and the chlorine pressure. Various azo type compounds and peroxides selected from the group of free-radical catalysts consisting of diacetyl peroxide; peracetic acid, hydrogen peroxide; tertiary butyl peroxide; tertiary butyl hydroperoxide; potassium persulfate; diazodiisobutyronitrile; methylethyl ketone peroxide and the like, may advantageously be employed. Preferably, when catalysts are employed, such catalyst should be one which has an efficient rate of decomposition in the suspending medium in which it is dissolved, in the required temperature range. In this regard it may be advantageous to employ a mixture of such catalysts, one of which has a temperature of efficient decomposition at or near the optimum initial chlorination temperature, and the other having an efficient decomposition at or near the optimum sequential chlorination temperature. Such catalysts may be added in a single step or continuously depending upon the reaction conditions and catalyst used.

The suspension chlorination procedure described herein as a preferred chlorination technique may be carried out at atmospheric pressure; however, best results are generally obtained wherein superatmospheric pressures are employed. Such chlorination pressure is not critical except as necessary to obtain an efficient rate of reaction. In this regard, it is pointed out that for a given catalyst or admixture thereof, at a given concentration in the suspending medium, the reaction rate is conveniently controlled by the rate of feed of chlorine and/or its partial pressure in the reaction vessel.

After the polyolefinic material has been suspension chlorinated to a desired degree, it may be easily separated from the inert suspending liquid by conventional means and washed and dried to prepare it for subsequent use.

The entire chlorination procedure or any desired part of it may be carried out batchwise or by continuous processing arrangements. For batch operations it is ordinarily suitable to employ conventional autoclaves and kettles or the like for conducting the reaction. However, it may also be conveniently conducted in a continuous process by any one of several suitable techniques. For example, it may be conducted by counter-current movement of the reactants through either horizontally or vertically disposed reactors which may be in the form of tubes and towers, or by using a cascading principle with a series of interconnected reaction chambers.

Substantially quantitative yields, based on the weight of the polymer to be chlorinated, may be frequently obtained by the chlorinating technique described herein. The attainment of such yields, as has been indicated, may often be factilitated by the practice of recycling techniques for unreacted portions of the chlorine and by conducting the involved reactions at more moderate rates.

It is furthermore possible and has proved of special advantage to carry out the chlorination in the presence of essentially chemical inert substances of inorganic or organic chemical nature which are such that they can be retained in the final product. Exemplary of such materials are: carbon black, titanium dioxide, magnesium silicate, and the like as well as organic plastic materials such as polyvinyl chloride and the like. Such materials may be employed for the desired purpose without significantly detracting from the highly desirable elastomeric properties of the chlorinated polymer. The addition of such fillers serves to inhibit excessive particle growth during chlorination, which agglomeration is undesirable in later manufacturing and fabrication steps. It is to be noted, however, that such materials may also be post-blended with the chlorinated product as one method of obtaining the most desirable values of the various physical properties.

It is to be understood, that the herein described chlorination procedures may be varied depending upon the particular polyolefins being halogenated, upon the types and amounts of wetting agents being employed, and with other factors. In any case, it is imperative that the chlorinated olefin polymer of the present invention is characterized by the highly desirable, and heretofore unobtainable, combination of properties, as previously specifically set forth herein.

Other suitable materials which may be blended with the chlorinated olefin polymer include both the pigment fillers and fibrous fillers. Examples of pigment fillers are the clays, calcium sulfate, and mica, among others including course fillers such as pulverized marble or limestone, if desired. Suitable fibrous fillers include asbestos, cork, wood, flour, etc.

Stabilizers are included in the compositions to protect the chlorinated olefin polymer against decomposition by the heat of processing or by subsequent exposure of the fabricated sheet material to climatic and environmental conditions. Suitable stabilizers include those materials conventionally employed in the preparation of vinyl polymer and copolymer sheet compositions, e.g. organic complexes and/or salts of lead, tin, barium, cadmium, zinc, sodium, etc., and particularly the barium-cadmium soaps as well as dibutyl tin laurate and dibutyl tin maleate, among others. Stabilizers are preferably used in amounts between about 1 and 5 parts by weight per 100 parts of the chlorinated olefin polymer constituent. Other conventional additives, such as epoxidized and nonepoxidized oils may be used. Low molecular weight polymers and waxes may also be employed, if desired, in amounts of up to about 15 parts per 100 parts of chlorinated olefin polymer.

Although the chlorinated olefin polymers employed for the purposes of the present invention are inherently resistant to burning, it may in some instances be advantageous to incorporate minor amounts, i.e., from between about 1 to 10 parts per hundred parts of chlorinated olefin polymer, of one or more flame-retarding agents, e.g., oxides of antimony and/or various halogenated materials such as tetrabromophthalic anhydride, perchloropentacyclodecane, tris(2,3-dibromopropyl)phosphate, tetrabromobisphenol-A, among many others.

It is generally unnecessary to add conventionally employed plasticizers to the chlorinated olefin polymer compositions; however, those materials as conventionally employed for vinyl polymers may be used in concentration less than about 10 percent as processing aids if desired.

The fusion blends contemplated by the present invention may be prepared by conventional techniques. Thus, for example, the necessary ingredients may be initially dry blended while in comminuted form in a mixer such as a ribbon blender and subsequently milled as on a two-roll compounding mill until the mixture becomes substantially homogeneous. The blend may then be extruded into sheet form or calendered to the desired thickness or injection or impact molded.

The following examples wherein all parts and percentages are to be taken by weight, illustrate the present invention but are not to be construed as limiting its scope.

EXAMPLE 1

In each of a series of experiments, an aqueous slurry comprising from about 3200 to 3600 grams of water and 160 to 180 grams of a polyethylene having an essentially linear and unbranched molecular structure containing less than about 1 methyl group per 100 methylene units in its molecule; a density of about 0.96; an average molecular weight of about 67,000 and which had been prepared by the previously referred to Ziegler catalyst process using a catalyst composed of triisobutyl aluminum and titanium tetrachloride; was charged to a 1½ gallon autoclave with from 6.4 to 7.2 grams of calcium chloride; from 3.2 to 3.6 g. of a platy magnesium silicate; about 0.5 cc. of di-tertiary butyl peroxide; and from about 24 to 27 drops of a commercially available wetting agent. Each charge was then separately chlorinated, as a first suspension chlorination step, under about 13 to 47 p.s.i. (gauge) of chlorine pressure at a temperature of between about 82 and 115° C. until a chlorine content of between about 5 and 23 percent was obtained.

Following completion of such first chlorination step, each charge was further individually chlorinated in a second suspension chlorination step, under a gauge pressure of 17–35 p.s.i. (as was considered necessary to obtain an efficient rate of chlorination), at a temperature of 126° C. until a total chlorine content of between 25 and 48 was obtained.

In an effort to determine the feasibility of blending the chlorinated polyethylene (CPE) with various types of plastics and ultimately with mixtures of many types of plastics, a first series of blends were prepared using five conventional plastic resins and different CPE resins to determine primarily which CPE would be most compatible with all plastics and best accomplish the desired result. Initially tensile and elongation only were tested to screen the CPE's. Table 1 shows the results of the tests. Only one level of CPE was chosen to make the comparison.

In all of the following tables, the following abbreviations are used:

CPE—Chlorinated polyethylene
ABS—Acrylonitrile butadiene styrene
LDPE—Low density polyethylene
HDPE—High density polyethylene
PVC—Polyvinyl chloride
PS—Polystyrene
DOP—Di-octyl-phthalate
phr.—Parts per hundred resin

CPE DESIGNATIONS

First two numbers indicate percent chlorine.

Third number relates to level of crystallinity on a one-to-five rating system representing substantially 0 to about 28%.

Fourth number relates to melt viscosity on a one-to-five rating system representing about 10,000 to about 30,000 poises determined by Instron Rheometer at 190° C., 150 sec.$^{-1}$ shear rate.

TABLE 1
[Physical properties of various plastics blended with different CPE's]

| LDPE | Tensile (p.s.i.) | Elongation (percent) |
|---|---|---|
| 100% LDPE | 1,980 | 500 |
| 75% LDPE/25% CPE: | | |
| 48:1:3 | 1,342 | 260 |
| 42:2:4 | 1,451 | 460 |
| 30:1:2 | 1,461 | 250 |
| 25:5:2 | 1,658 | 510 |
| 36:2:2 | 1,661 | 550 |

TABLE 1—Continued
[Physical properties of various plastics blended with different CPE's]

| LDPE | Tensile (p.s.i.) | Elongation (percent) |
|---|---|---|
| HDPE: | | |
| 100% HDPE | 4,295 | <100 |
| 75% HDPE/25% CPE: | | |
| 48:1:3 | 3,983 | 100 |
| 42:2:4 | 3,551 | <100 |
| 30:1:2 | 3,471 | 100 |
| 25:5:2 | 3,608 | 100 |
| 36:2:2 | 3,394 | <100 |
| Rigid Type I PCV: | | |
| 100% Type I PVC | 7,542 | <50 |
| 75% PVC/25% CPE: | | |
| 48:1:3 | 4,373 | 325 |
| 42:2:4 | 4,051 | 62 |
| 30:1:2 | 2,534 | 88 |
| 25:5:2 | 2,567 | 60 |
| 36:2:2 | 3,364 | 100 |
| ABS: | | |
| 100% ABS | 6,094 | <50 |
| 75% ABS/25% CPE: | | |
| 48:1:3 | 4,801 | 115 |
| 42:2:4 | 4,477 | 105 |
| 30:1:2 | 3,633 | 25 |
| 25:5:2 | 3,736 | 35 |
| 36:2:2 | 4,153 | 60 |
| PS: | | |
| 100% PS | ¹ 765 | |
| 75% PS/25% CPE: | | |
| 48:1:3 | 4,819 | 0 |
| 42:2:4 | 4,566 | 0 |
| 30:1:2 | 4,027 | 0 |
| 25:5:2 | 3,927 | 0 |
| 36:2:2 | 4,201 | 0 |

¹ Sample broke in tensile bar clamp which was not designed for GP polystyrene. Published data is approximately 6,600.

The following Table 2 illustrates additional test results with varying combinations of thermoplastic materials and chlorinated polyethylenes.

TABLE 2
[Physical properties of plastic blends with selected CPE's]

| | Tensile (p.s.i.) | Elongation (percent) |
|---|---|---|
| LDPE/HDPE/PVC/PS (25% each) | 678 | 0 |
| Plus 33% CPE: | | |
| 42:2:4 | 1,600 | 42 |
| 48:1:3 | 1,455 | 25 |
| 36:2:2 | 1,152 | 48 |
| PVC/HDPE/PS (33⅓% each) | 2,061 | 0 |
| Plus 33% CPE: | | |
| 42:2:4 | 1,740 | 25 |
| 48:1:3 | 1,768 | 28 |
| 36:2:2 | 1,486 | 35 |
| Flexible PVC/LDPE (50/50) | 669 | 25 |
| Plus 33% CPE: | | |
| 42:2:4 | 648 | 230 |
| 48:1:3 | 590 | 121 |
| 36:2:2 | 600 | 275 |

The above data illustrates that the chlorinated polyethylene designated CPE 42/2/4, a 42 percent chlorine material having a residual crystallinity of about 8 percent, appears to be the most compatible with the various resins tested. Using this chlorinated polyethylene, an additional series of polymer blends was prepared with and without the chlorinated polyethylene.

To illustrate the improvement in proportion obtainable by the process of this invention, the following Table 3 illustrates the result of this series.

TABLE 3.—EFFECT OF CPE ON POLYMER BLEND PROPERTIES

| Resin (ratio 50:50) | Tensile (p.s.i.) | Tensile impact (ft. lbs./in.²) | Resin (ratio 33:33:33) | Tensile (p.s.i.) | Tensile impact (ft. lbs./in.²) |
|---|---|---|---|---|---|
| ABS/PS | 881 | 0 | ABS/PS/CPE | 2,756 | 1.3 |
| ABS/HDPE | 746 | 0 | ABS/HDPE/CPE | 1,848 | 4.4 |
| ABS/LDPE | 901 | 1.3 | ABS/LDPE/CPE | 1,380 | 7.2 |
| ABS/PVC | 6,445 | 3.4 | ABS/PVC/CPE | 3,158 | 21.7 |
| PS/HDPE | 688 | 0.7 | PS/HDPE/CPE | 2,332 | 1.3 |
| PS/LDPE | 1,230 | 1.0 | PS/LDPE/CPE | 1,128 | 1.3 |
| PS/PVC | 322 | 0.6 | PS/PVC/CPE | 2,051 | 1.2 |
| PVC/LDPE | 1,010 | 0.5 | PVC/LDPE/CPE | 1,266 | 4.9 |
| PVC/HDPE | | 0.9 | PVC/HDPE/CPE | 1,529 | 3.9 |

Production and sales figures of the various types of plastics were used to determine a possible ratio of scrap plastics generated in the United States. In a next series of experiments CPE was combined in various amounts with the simulated scrap to determine the approximate level of CPE required to result in a usable product. Table 4 illustrates results obtained with the simulated scrap blends. The optimum concentration level of CPE appeared to be between 15-35% of the total blend.

TABLE 4

| | Tensile impact (ft. lbs./in.$^2$) | 100% modulus | Elongation (percent) | Ultimate tensile (p.s.i.) |
|---|---|---|---|---|
| 1. LDPE/HDPE/PVC/PS (25% each) | 0 | 0 | 10 | 1,960 |
| Plus 15% CPE 42:2:4 | 0 | 0 | 15 | 1,790 |
| Plus 33% CPE 42:2:4 | 2.6 | 0 | 50 | 1,500 |
| Plus 50% CPE 42:2:4 | 10.7 | 925 | 415 | 964 |
| 2. 50% LDPE/25% HDPE/12.5% PVC and PS | 0 | 0 | 60 | 1,650 |
| Plus 15% CPE 42:2:4 | 2.29 | 0 | 98 | 1,530 |
| Plus 33% CPE 42:2:4 | 6.08 | 0 | 115 | 1,100 |
| Plus 50% CPE 42:2:4 | 14.1 | 862 | 278 | 940 |
| 3. 1 except with PVC with 80 phr. DOP | 0 | -------- | 14 | 1,522 |
| Plus 15% CPE 42:2:4 | 1.7 | -------- | 34 | 1,300 |
| Plus 33% CPE 42:2:4 | 17.3 | 840 | 220 | 865 |
| Plus 50% CPE 42:2:4 | 47.6 | 670 | 745 | 766 |

EXAMPLE 2

To prove that the results obtained in Example 1 would be reproduced on actual plastic scrap, an employee of a local sanitary landfill was employed to obtain approximately 100 pounds of waste plastic material (following a brief training session to permit such employee to be able to distinguish plastic materials from other materials but not, however, to distinguish plastic materials by type).

The collected waste material was cleaned and sorted and found to contain the following amounts and types of plastic material.

| | Percent |
|---|---|
| LDPE approximately | 44 |
| HDPE approximately | 19 |
| Polystyrene approximately | 31 |
| PVC-ABS-PP approximately | 6 |

Analysis was not performed on each piece to determine its type and the identification was accomplished from experience in dealing with plastics. The scrap was then ground and mixed with CPE. Table 5 illustrates results obtained using various levels of CPE. A product with reasonable physical properties was obtained from the mixture using CPE, whereas without the CPE, a cheesy, brittle product was the result.

TABLE 5.—PHYSICAL PROPERTIES OF ACTUAL PLASTICS SCRAP WITH INCREASING LEVELS OF CPE 42/2/4

| | Compression molded samples | | |
|---|---|---|---|
| | Elongation (percent) | Tensile (p.s.i.) | Tensile impact (ft. lbs./in.$^2$) |
| 100% scrap plastic mix | 11 | 1,450 | 0 |
| 15% CPE/85% scrap plastic mix | 11.7 | 1,715 | 0.45 |
| 17.5% CPE/82.5% scrap plastic mix | 12.7 | 1,690 | 0.54 |
| 20% CPE/80% scrap plastic mix | 15.7 | 1,715 | 0.76 |
| 22.5% CPE/77.5% scrap plastic mix | 17.7 | 1,712 | 1.5 |
| 25% CPE/75% scrap plastic mix | 20 | 1,600 | 1.6 |
| 27.5% CPE/72.5% scrap plastic mix | 22 | 1,600 | 2.83 |

All previous work had been done with samples produced on a roll mill and press polished. The remainder of the scrap plastic was ground and mixed, with and without CPE, and injection molded into test bars. Normal injection molding techniques were used with a screw injection machine. Samples were molded of 100% scrap plastic and 75% scrap plastic/25% CPE. Tensile impact data obtained for these samples were 0.709 (ft. lbs./in.$^2$) for 100% scrap and 10.5 (ft. lbs./in.$^2$) for the 75/25 scrap/CPE blend.

What is claimed is:

1. A method for the reclamation of multiple component mixtures of waste thermoplastic materials to form compatible resin blends of improved properties comprising preparing a fusion blend of said waste thermoplastic materials with from about 15 to 35 weight percent based on the weight of said blend of a chlorinated polyethylene containing from about 25 to 50 weight percent of chemically combined chlorine and having a relative crystallinity of between about 15 and 28 weight percent when containing about 25 weight percent chlorine, decreasing to a relative crystallinity of less than about 10 percent when containing about 34 or more weight percent chlorine and a melt viscosity of from about 10,000 to 30,000 poises determined by Instron Rheometer at 190° C. at a 150 sec.$^{-1}$ shear rate.

2. The method of claim 1 wherein said chlorinated polyethylene contains about 42 weight percent chlorine and contains about 8 percent of residual crystallinity.

References Cited

UNITED STATES PATENTS 3,210,301    10/1965    White _____ 260—2.3

SAMUEL H. BLECH, Primary Examiner

U.S. Cl. X.R.

260—94.9 H, 889, 897 A, 897 C